(12) United States Patent
Jarvinen

(10) Patent No.: US 8,159,357 B1
(45) Date of Patent: Apr. 17, 2012

(54) MEANS TO PROSPECT FOR WATER ICE ON HEAVENLY BODIES

(76) Inventor: Philip Onni Jarvinen, Amherst, NH (US)

( * ) Notice: Subject to any disclaimer, the term of this patent is extended or adjusted under 35 U.S.C. 154(b) by 0 days.

(21) Appl. No.: 12/383,894

(22) Filed: Mar. 30, 2009

(51) Int. Cl.
*G08B 19/02* (2006.01)
(52) U.S. Cl. ...... 340/580; 340/581; 340/962; 244/134 R
(58) Field of Classification Search ............... 340/962, 340/581, 580; 244/134 R
See application file for complete search history.

(56) References Cited

U.S. PATENT DOCUMENTS

| | | | | |
|---|---|---|---|---|
| 6,105,695 | A | 8/2000 | Bar-Cohen et al. | 180/8.5 |
| 6,112,843 | A | 9/2000 | Wilcox et al. | 180/345 |
| 6,488,306 | B1 | 12/2002 | Shirey et al. | 280/474 |
| D487,715 | S | 3/2004 | Lindemann et al. | D12/1 |
| D488,093 | S | 4/2004 | Lindemann et al. | D12/1 |
| 7,439,877 | B1 | 10/2008 | Jarvinen | 340/962 |
| 7,439,887 | B2 * | 10/2008 | Leung | 341/106 |

OTHER PUBLICATIONS

Mars Phoenix Lander—"Phoenix", http:// en.wikipedia.org/wiki/Mars_Phoenix_Lander/.
Mars Opportunity Rover—"Opportunity rover", http:// en.wikipedia.org/wiki/Mars_opportunity_rover/.
Mars Spirit Rover—"Spirit rover", http:// en.wikipedia.org/wiki/Mars_spirit_rover/.
"Thermal and Evolved Gas Analyzer"—(TEGA), http:// en.wikipedia.org/wiki/TEGA/.
"Mars Pathfinder", http:// en.wikipedia.org/wiki/Mars_Pathfinder/.
"Viking 2", http:// en.wikipedia.org/wiki/Viking_2/.
"Viking 1", http:// en.wikipedia.org/wiki/Viking_1/.
"Mars 3", http:// en.wikipedia.org/wiki/Mars_3/.
"Luna 24", http:// en.wikipedia.org/wiki/Luna_24/.
"Luna 21", http:// en.wikipedia.org/wiki/Luna_21/.
"Luna 20", http:// en.wikipedia.org/wiki/Luna_20/.
"Luna 17", http:// en.wikipedia.org/wiki/Luna_17/.
"Luna 16", http:// en.wikipedia.org/wiki/Luna_16/.
"Luna 9", http:// en.wikipedia.org/wiki/Luna_9/.
"Apollo 17", http:// en.wikipedia.org/wiki/Apollo_17/.
"Apollo 16", http:// en.wikipedia.org/wiki/Apollo_16/.
"Apollo 15", http:// en.wikipedia.org/wiki/Apollo_15/.
"Apollo 14", http:// en.wikipedia.org/wiki/Apollo_14/.
"Apollo 12", http:// en.wikipedia.org/wiki/Apollo_12/.
"Apolki 11", http:// en.wikipedia.org/wiki/Apollo_11/.
"Surveyor 2". http:// en.wikipedia.org/wiki/Surveyor_2/.
"Surveyor 1", http:// en.wikipedia.org/wiki/Surveyor_1/.

* cited by examiner

*Primary Examiner* — Hoi Lau

(57) ABSTRACT

Apparatus and a method are described for prospecting for water ice on heavenly bodies with the apparatus consisting of site preparation tools and a water ice detector unit. The apparatus is attached at the end of any robotic arm equipped lander or rover spacecraft; for instance, lander designs such as Mars Phoenix or rover designs such as Mars Spirit and Opportunity. Supported on an internal, moveable carriage, the apparatus is also incorporated into smaller, dedicated water ice detection rover spacecraft. The water ice detection unit inserts electrodes into or against a potential water ice deposit and confirms the presence of water ice by making combination impedance and thermal conductivity measurements.

9 Claims, 15 Drawing Sheets

MEANS TO PROSPECT FOR WATER ICE ON HEAVENLY BODIES

COPYRIGHT NOTICE

A portion of the disclosure of this patent document contains material that is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The invention relates to the field of space exploration. In particular it relates to the location and identification of water ice on heavenly bodies while remotely exploring these bodies before human life is upon them and in cooperation with human life after life has arrived. The present invention is for a water ice detection system carried on-board a lander spacecraft or rover spacecraft or by a human that lands on a heavenly body and prospects for water in the form of water ice.

BACKGROUND OF INVENTION

Recently, human life on earth has become able thru rocketry to explore heavenly bodies including planets, comets and asteroids. With the exception of prior visits to and landings on the Moon by humans, exploration to date has been conducted remotely by unmanned spacecraft that circle or pass by the heavenly bodies for observations, by unmanned vehicles carried by the spacecraft which are subsequently released for impact with the bodies or by unmanned vehicles that land on the body and then explore it either at a fixed location or by roving over the bodies surface. A major thrust of the later remote explorations is to determine whether life, as a human knows of it, exists presently or has existed in the past on these bodies with the presence of water now or in the past taken as a primary indicator of a habitat suitable for life.

Prior Missions to the Moon and Mars

Six manned moon landings occurred between Jul. 20, 1969 and Dec. 11, 1972 including Apollo 11, Apollo 12, Apollo 14, Apollo 15, Apollo 16 and Apollo 17. In the realm of unmanned vehicles which were directed to collide with the moon, the Soviet Union's Luna 2 and the American spacecraft Ranger 4 are included. Unmanned spacecraft that made soft landings on the moon include Luna 9, Luna 16, Luna 17 with the Lunokhod 1 rover, Luna 20, Luna 21 with the Lunokhod 2 rover, Luna 24 and Surveyor 1 and Surveyor 3. Luna 16, 20 and 24 are still the only robotic missions that have brought soil samples back to the earth from another world with Luna 24 drilling a six and one half foot long core soil sample for that purpose.

Also, a number of successful unmanned missions have been flown to Mars during the period from 1964 to 1971 including the Mariner 4, Mariner 6, and Mariner 7 flybys. This period also included a successful orbiter mission to Mars designated Mars 3 and the Mariner 9 orbital mission both in 1971. Other successful orbital missions to Mars include Mars 5 in 1973, Mars Global Surveyor in 1996, Mars Odyssey in 2001, Mars Express in 2003 and Mars Reconnaissance in 2005. Soft lander missions to Mars include Mars 3 in 1971, Viking 1 and Viking 2 in 1975, Mars Pathfinder Rover in 1997, Mars Exploration Rover Spirit and Mars Exploration Rover Opportunity in 2003 and the Phoenix Mars Polar Lander in 2007.

Scientific Instruments Carried on Moon and Mars Landers

Science instruments carried on Moon soft landers have included one or more of the following: cameras for lunar photography, radiation and temperature detectors, television cameras, strain gages mounted on the spacecraft's leg to measure the landing impact forces, core sample drills, soil density and mechanical property measuring instruments, magnet arrays, X-ray fluorescence spectrometers, cosmic ray detectors, laser devices, surface soil sampling scoops, surface penetrators to measure surface strength, solar X-ray, and local magnetic field and ambient light level measurement apparatus.

None of the earlier Moon landers were equipped with water or water ice detection equipment because these materials were not believed to be anywhere on its surface. Only much later in time, did satellite radar measurements suggest the possibility of water ice at the Moon's north and south poles and then interest increased in the detection of water or water ice on the Moon.

With regard to Mars soft landers, science instruments on Mars 3 descent module and lander included two television cameras, mass spectrometer, temperature, pressure and wind sensors, devices to measure mechanical and chemical properties of the surface including a mechanical scoop to search for organic materials. The Mars 3 descent module had a small 8.2 kilogram (18 pound) Mars rover on board which was to move across the surface on skis while connected to the lander with an imbilical. The rover carried a dynamic penetrometer and a radiation dosimeter. All communication with the descent module was lost after 15 seconds and because of this, it appears that the rover never saw action or never reported back.

The Viking landers included a biology instrument, gas chromatograph/mass spectrometer, X-ray fluorescence spectrometer, seismometer, meterology instrument, stereo color cameras, and instruments to measure physical and magnetic properties of the soil, and the aerodynamic properties and composition of the Martian atmosphere with changes in altitude.

The Mars Pathfinder probe landed on Mars on 4 Jul. 1997 and consisted of a lander and a lightweight, wheeled rover called Sojourner, The rover weighed 10.4 kilograms (23 pounds) and was 65 centimeters (25.6 inches) long by 48 centimeters (18.9 inches) wide by 30 centimeters (11.8 inches) tall. Scientific instruments on the lander included a stereoscopic camera with spatial filters on an expandable pole called the Imager for Mars Pathfinder (IMP), magnetometer and anemometer along with atmospheric and meteorological sensors called the Atmospheric Structure Instrument and Meteorology Package (ASI/MET) and temperature and pressure measuring equipment. The rover had three cameras: front mounted black and white stereo and a rear color camera. It also carried an Alpha Proton X-ray Spectrometer (APXS), a wheel abrasion experiment, materials adherence experiment, accelerometers and potentiometers.

The Phoenix Mars Polar Lander carried a Surface Stereo Imager camera (SSI) with multispectral capability on a 2.0 meter (6.6 foot) mast, temperature and pressure sensors, a Robotic Arm (RA) used to dig in the soil and return a soil sample to the Thermal Evolved Gas Analyzer instrument (TEGA) for processing; the TEGA instrument being flown first on the failed 1999 Mars Polar Lander that contact was lost with on arrival at Mars, a camera on the robotic arm (RAC), a soil temperature probe, a light detection and ranging device (LIDAR), a meteorological station (MET), a microscopy, electrochemistry and conductivity analyzer (MECA) and a Mars Descent Imager (MARDI).

A review of the scientific instruments carried by all previous extra-terrestrial lander spacecraft, whether landing on the Moon or Mars, and listed above demonstrates that the TEGA instrument on the Phoenix lander is the first and only scientific water detection instrument ever carried by any spacecraft lander or rover to date (other than an earlier version of TEGA carried on the Mars Polar Explorer which was lost when it failed to report back when it reached Mars). In summary, TEGA's specific purpose was the detection of water in outer space and in particular on Mars. TEGA works by having a sample of soil from Mars, potentially a sample containing water ice, scooped from the surface and deposited in its furnace. It then heats the sample up in temperature until all ingredients in the sample vaporize. The vapor is then passed through a mass spectrometer to detect water. It does not measure a direct, intrinsic property that may be used to positively identify water ice. It indirectly infers that water is present in the potential water ice sample based on measured spectrometer results. The present invention provides an improved way to identify water ice in a sample. It provides a distinct confirmation of water ice based on the measurement of a specific signature that water ice and only water ice exhibits when electrically excited over a band of frequencies. Confirmation of water ice is done on a sample that exists in original form at its original temperature. No heating and vaporization of the potential water ice sample is involved.

Extra-Terrestrial Robots

Mechanical robots of all sizes, shapes and types have been proposed for use on earth and the variations number in the thousands. Mechanical robots of many designs have also been proposed for use in space including, for example, robots that crawl: see U.S. Pat. No. 6,105,695 (2000) by Bar-Cohen, Y., et al, that are highly mobile: see U.S. Pat. No. 6,112,843 (2000) by Wilcox, B. H., et al, that have been designed, fabricated and flown to Mars: see U.S. D487,715 (2004) by Lindemann, et al, that utilize a number of robot platforms coupled together; see U.S. Pat. No. 6,488,306 (2002) by Shirey, D. L., et al. and that hop: see NASA JPL Internal Research Program, Task #15, "Innovative Mobility Systems: Hopping Robots", completed Dec. 31, 2000, at http://www-robotics.ipl.nasa.gov/tasks/completed.cfm.

The robots developed at NASA JPL such as the Mars Rover Spirit, Mars Rover Opportunity and the Mars Lander Phoenix are the only platforms that have actually operated on the surface of a heavenly body other than the earth for extended periods of time; now more than five years for Spirit and Opportunity. During operation on Mars, the three spacecraft have been watched, prodded and monitored by those on earth; day by day, hour by hour and minute by minute. These spacecraft have provided an experience set for operation in space second to none. The world has watched as problems in their operation have occurred and have been cured. Problems encountered and cured include computer problems, robotic arm shoulder problems, and problems associated with wheel slippage when motoring around. There have been other problems that have cured themselves; such as the collection of dust on the solar cell array which lowered power production but was cured somewhat by actions of the Mars atmosphere itself. The operation of the Spirit and Opportunity rovers on Mars has demonstrated that the six wheeled rocker-bogie mobility architecture and the navigation algorithim control set used by NASA JPL are proven features from an engineering point of view. Based on the accumulated experience set and the proven engineering set noted above for Spirit and Opportunity, the six wheeled rocker-bogie and navigation algorithims are adopted for use on the new, smaller water ice detection rover spacecraft to be discussed below.

TEGA Instrument (Thermal Evolving Gas Analyzer)

The claim that water exists on the Moon and on Mars is founded on radar data taken from overhead passing satellites. Confirmation of water ice on the Moon, by actual detection with a device or by a human operating on the surface of the moon, awaits future missions in which unmanned and/or manned spacecraft will be landed on that planet. The descriptor "water ice" is used herein in this patent application to differentiate that material from other frozen materials that may be found on heavenly bodies such as frozen carbon dioxide, etc.

The landing of instrumented spacecraft on Mars has occurred previously including the Viking Lander Vehicle in the mid 1970's that did not confirm life on Mars and the Mars Phoenix Lander in 2008 which found water thru the use of its Thermal and Evolved Gas Analyzer (TEGA) instrument. The TEGA instrument is the only instrument known to the applicant that has been used previously on the surface of a heavenly body to detect the presence of water. A patent search was conducted for the TEGA instrument or any similar instrument but no relevant patent or patent application was found.

The TEGA instrument of Phoenix is a combination of a high temperature furnace and a mass spectrometer instrument. A robotic arm on the Phoenix vehicle operates to dig up a soil sample and then deposit it into one of the ovens in the TEGA instrument where it is heated up to near 1000 degrees C. As the sample is heated up, water ice, if present, and other volatile materials are vaporized with the vapor passed into the mass spectrometer for evaluation. Based on spectrometer measurements, the TEGA instrument infers whether water is present or not. Note that TEGA infers that water is present but does not make a measurement of a property which is intrinsic only to water to provide unquestionable proof of the existence of water. The present invention to be discussed below does provide unquestionable proof of the existence of water based on measuring an intrinsic signature of a prospective water ice sample that can only be associated with water ice.

During actual operation of the Phoenix robotic arm in conjunction with the TEGA instrument on the surface of Mars in 2008, the transfer of soil to the TEGA instrument was plagued by soil sticking in the scoop of the robotic arm and refusing to drop from the scoop into the TEGA's ovens. Several tries were aborted because of this problem. Successful transfer was only achieved when the soil was left in the scoop for two days which allowed, according to the investigators, enough moisture to evaporate from the material in the scoop that the material was not as sticky as before and dumping of soil into TEGA was accomplished. From presently available information on TEGA processing, it appears that only one soil sample was processed during the entire operation of TEGA; the aborted attempts having eliminated two of the furnaces from further use and an on-board electrical problem allowing only one final attempt. In that remaining attempt, the signal levels from the sample that was processed were much reduced with the reduction attributed to the prior evaporation of the sample before it was received by TEGA. The signal levels measured on that one sample were only 10% of the TEGA full scale readings. Thus, it should be realized that the historic announcement, that water is present on Mars, was based on a single reading at the low end of the instruments detection range.

The problems encountered by the Phoenix TEGA, the sticky soil and the reduced detection probability due to a low test reading, demonstrate that an improved approach is needed for the detection of water ice on heavenly bodies. The invention discussed in this application combines a number of components together in an assembly that is attached to a non-moving lander spacecraft or to a rover spacecraft or to a unit carried by a human and used to prospect for water ice. The detection of water ice by this embodiment is based on water ice exhibiting a specific signature when excited electrically; a signature which is measured by one of the components comprising the assembly attached to the lander, rover or unit carried by a human.

SUMMARY OF THE INVENTION

The subject invention is a means to prospect for water ice on heavenly bodies. The water ice detection system employs a water ice detector unit and physically separated but electrically connected water ice detector electrodes collocated with components for water ice test site preparation. The water ice detector system is in the form of an assembly which may be mounted, for example, on an existing class of lander spacecraft or rover spacecraft designs. The existing class of spacecraft designs includes those that have already been used to explore Mars and which may be used again for that purpose on Mars or used on other bodies such as the Moon. The assembly may also be incorporated as part of a future new larger class of lander and rover spacecraft with robotic arms dedicated to the exploration for water ice or used as the foundation for a class of smaller water ice detection rovers without robotic arms.

The existing class of spacecraft designs referred to above are those used in the Mars Exploration Rover Mission for the Spirit and Opportunity rovers with robotic arms which landed on Mars in 2004 and for the Mars Phoenix lander mission in 2007 with robotic arm. The solar powered, high wheeled rovers, Spirit and Opportunity, were equipped with an instrument deployment device (IDD), also called the rover robotic arm (RA), which held and maneuvered instruments on the end of the arm to inspect and operate on Martian rocks and soil. The robotic arm is equipped with three joints which allow the arm to extend, bend and angle precisely to work against a rock or the surface of Mars. The four instruments on the end of the arm in a cross shaped instrumentation attachment are a Microscopic Imager, Mossbauer Spectrometer, Alpha Particle X-Ray Spectrometer and Rock Abrasion Tool. The cross shaped attachment holds these instruments and spins through a 350 degree turning range to employ them.

The present invention replaces those instruments on the cross shaped attachment with a similar water ice detection cross containing four devices, three of which are used for site preparation for the water ice detection measurement and the fourth, the electrodes of the water ice detector unit, which are placed in or on the cleansed surface for water ice detection. The site preparation devices include a surface scraper, a brush for cleaning the surface after scraping and cutters, as required, to form depressions in the soil surface into which the electrodes are placed. The ability of the present instrumentation cross on Spirit and Opportunity to rotate on an axis through nearly three hundred and fifty degrees in the horizontal plane is preserved with the new water ice detection cross. The scraper is placed against the surface first, followed by a water ice detection cross rotation to place the brush against the surface for cleaning after scraping, then another rotation to make cuts in the surface of the heavenly body as required by the use of a particular electrode design and then a fourth rotation to place the electrodes of the water ice detector cross in position in or against the soil for a measurement. Electric power consumed by the water ice detection unit is provided by the rover's main power supply.

Thus, the Spirit and Opportunity rover designs may be used directly for water ice prospecting simply by replacing the existing cross shaped instrumentation attachment of that rover design with the new water ice detection cross of the present invention along with the placement of the associated water ice detection unit in the existing rovers Warm Electronic Box (WEB) which maintains temperatures in the WEB in the range from −40 C. to +40 C. The proven design for the Spirit and Opportunity rovers, backed by all the pre-flight testing done on them, is a cost effective solution for a water ice detecting spacecraft because a majority of the needed design work and proof testing has already been accomplished. For future rover designs which may be the same size as the Spirit and Opportunity rovers or larger and that may be equipped with a robotic arm, the existing robotic arm of Spirit or a modified version of the robotic arm on Phoenix with both robotic arms equipped with the new water ice detector cross, also represent a cost effective combination for water ice prospecting. The Phoenix spacecraft may also be converted to an ice detection mission by replacing the scoop on its robotic arm with the present invention; the water ice detection cross.

A new, smaller class of spacecraft rovers without robotic arm and designed for a dedicated water ice detection mission employs most of the features included in the design for the larger Spirit and Opportunity rovers though many are reduced in physical size because of improvements made in technology in the past five or more years. These features include similar Hazcams (Hazard Avoidance Cameras), Navcams (Navigation Cameras), Pancams, solar cells, batteries and radioisotope heater units, respectively, for the production and storage of electricity and for heating the batteries, Hazcam and Navcam associated software, WEB heating and cooling techniques, boggy and drive train, communication gear, protocols and bus interfaces, Inertial Measurement Unit (IMU), and computer with on-board memory and rover health monitoring software and methods. When these features are included in a $2^{nd}$ generation design based on the earlier Spirit and Opportunity designs, they are reduced substantially in size, weight, power consumption and cost. To minimize the mass and size of the new, smaller water ice detection rover spacecraft design, a revised UHF communication unit and UHF antenna are used for communication to and from the earth via local circling satellites and the high and low gain antennas used on Spirit and Opportunity for direct communication to and from the earth are eliminated.

The physical shape of the new, smaller rover differs from that of the larger Mars rovers because of a need to balance the new rover to keep it from possibly tipping over while conducting a search for water ice. Spirit and Opportunity rovers were able to use a robotic arm to carry instruments because they were large enough so that any tipping moments or forces arising from extension or deflection of the three foot long robotic arm with tip attached instrumentation cross were readily balanced by the more massive properties of the rover. The Spirit and Opportunity rovers stood 1.5 meters (4.9 feet) high, by 2.3 meters (7.5 feet) wide and 1.6 meters (5.2 feet) long and weighed 181 kilograms (400 pounds). For the class of large lander spacecraft such as that corresponding to a Phoenix like design, or rovers like the Mars Science Laboratory or perhaps a completely new, larger rover spacecraft, a robotic arm with the water ice detection cross mounted at its tip is also an option.

The new, smaller rover spacecraft dedicated to water ice prospecting, if designed without extensible and retractable outriggers for balance support, needs to avoid the use of a robotic arm in order to maintain balance because of the reduced balancing ability of the rover spacecraft itself. It needs to have its water ice detection apparatus with water ice detection electrodes, site preparation devices and mechanisms for ice detector electrode insertion centrally mounted in the rover spacecraft so as to diminish any forces or moments generated during water ice detection operation.

During operation on the surface of a heavenly body, the rover spacecraft or human moves to the destination where the water ice measurement is to be made. The test site is then prepared by cleaning debris from around the water ice detector measurement point. This is accomplished by a combination of scraping and brushing of the site using attachments mounted on the water ice detection cross. The cleaning and site preparation is continued until video from the on-board cameras, robotic arm mounted cameras and/or water ice detection cross mounted cameras which view the test site indicates that a suitable test site preparation had been achieved. For example, photographs and video from the Mars Phoenix Lander showed that water ice on Mars is covered by a thin layer of material that must be removed before a clean water ice surface appears. In Phoenix's case, the needed cleansing action was provided by the jet exhaust from the lander vehicle's deceleration and control rockets during landing. In the present invention and following site preparation, the electrode portion of the water ice detector cross is inserted into or against the soil for a measurement. The choice of procedure to be used to place the electrode portion of the water ice detector system into or against the soil, depends on the type of water ice detector electrode geometry chosen for the measurement.

The water ice detector unit operates by electrically exciting a potential water ice sample between two electrodes at a set voltage and over a band of excitation frequencies. In one embodiment, this is accomplished by inserting two planar rectangular electrodes into the soil whose active electrodes face each other and are separated by a known distance. The electrodes are inserted to a depth such that the volume between the plates is filled with the test sample material and a measurement follows. In this embodiment, the insertion depressions (cuts) into which the electrodes are inserted are formed into the prepared site prior to electrode insertion, for example, by rotating circular saws spaced apart by the desired inter-electrode distance. These saws are dipped into the cleansed measurement site and then removed after making the cuts. Insertion of the planar electrodes and a measurement follows. The electrode configuration for this embodiment is referred to from here on as "capacitor like" electrodes.

The water ice diagnostic unit also works for inserted electrodes of non-planar shape. In a second embodiment, a circular cut is made into the surface with a rotating, hollow cylindrical bit which leaves a cylindrical test sample in place after the bit is removed. Two electrodes, each with segmented cylindrical section and spaced apart from each other so as not to touch electrically, are then inserted into the cylindrical cut with the test sample material situated between the electrodes. A measurement is then made.

In a third embodiment, the cylindrical bit that cuts the depression is non-metallic but has two metal electrodes on portions of its inner cylindrical faces. In this case, the desired measurement is then accomplished by hooking the electrodes up to the electronics of the water ice detector system after cutting a cylindrical impression in the test site without removing the bit. This is accomplished by including electrical wires that run up the shaft to the vicinity of the water ice detection electronics. Electrical connection between the electrical wires from the water ice electrodes to the water ice detection unit is accomplished after the shaft comes to a stop by making chinese finger, stent type connections between the two sets of wires. The stent connectors are placed over the wires, which in turn are attached below to the electrodes, and then the stents are cinched down on the wires to make the electrical connection.

A fourth electrode embodiment utilizes a planar electrode of annular form that has the appearance of a bullseye pattern when viewed from above. This flat electrode arrangement allows the desired measurement to be made by simply pressing the planar electrode against the cleansed surface at the test site. No cuts are needed to the surface of the heavenly body in order to test for water ice presence when the planar, annular bullseye electrodes are used: just contact of the planar electrodes against the surface. The flat, bullseye electrode typically has an inner circular electrode of 1.9 centimeters (¾ inches) diameter and an overall diameter of 9.5 centimeters (3¾% inches). The three prior electrode embodiments discussed above cover smaller surface areas than that utilized by the bullseye type electrodes.

The water ice detection approach that is utilized in the water ice detector unit in conjunction with the different possible electrode embodiments discussed above is that described in U.S. Pat. No. 7,439,877 (2008) for aircraft ice detection entitled "Total Impedance and Complex Dielectric Property Ice Detection System" by Philip O. Jarvinen, incorporated here by reference. Mr. Jarvinen is also the inventor for this patent application. Identification of water ice in the present invention is done by following the procedure employed in the reference patent for ice. Water ice is identified when impedance measurements made at a given test sample temperature as a function of water ice sample excitation frequency form a semicircular shaped signature when transformed analytically into the relative permittivity/dielectric loss factor space; referred to from now on as the "complex space".

As discussed below in the Detailed Description Section of this application, the range of test sample scanning frequencies selected for a test measurement is dependent on the temperature at which the test sample measurement is being made. In order to obtain a full semicircular shaped signature, a specific range of required frequencies is used because of the marked variation of water ice Debye relaxation time with temperature which affects the choice. For the aircraft ice detection case considered in the reference patent, a range of frequencies from 40 Hz to 40,000 Hz was selected to cover expected aircraft ice temperatures in the range from 0 C. (32 F.) to −40 C. (−38 F.). This choice provided a complete semicircular signature, known as a Cole-Cole shape, for confirmation of ice. The reference patent also includes the use of the characteristics of a single vector in complex space to confirm ice. That same technique is applicable to the present water ice detection system and is also discussed in the Detailed Description Section. In the Detailed Description Section, the need for algorithms for the detection of water ice is described to cover test samples that may be contaminated somewhat with small amounts of soil should the surface cleansing operation not completely remove all the surface soil covering the potential water ice sample.

Exploration of the universe for the discovery of life has focused recently on the exploration of two planets: the Moon and Mars. In general, surface temperatures on the Moon vary significantly from 100 C. (212 F.) in the day to −180 C. (−292 F.) at night. However in the Moon's north pole region where water ice is suspected, a sweet spot in temperature is believed to exist on the rim of the Peary crater where surface temperature conditions remain very stable averaging −50 C. (−58 F.). The Moon's southern pole, where water ice is also suspected to be, is in perpetual darkness and its surface temperature is believed to be −237 C. (−397 F.).

On Mars, the surface temperatures are generally in the range from −17 C. (+1 F.) to −107 C. (−178 F.) with temperatures at the planet's polar caps, where water ice is expected to be, dropping to −143 C. (−225 F.) in the winter. Thus, the equipment used to explore for water ice on the Moon and Mars will need to operate at a specific temperature point in a broad range of possible temperatures with the physical destination selected for exploration dictating the specific operating temperature conditions for the ice detection equipment and the choice of test frequencies used.

Depending on the electrode geometry selected for use on the new, smaller size rover spacecraft, water ice detection assemblies will differ in physical layout. In all cases, physical movement of the electrodes and site preparation tools towards the surface of the heavenly body is required until the electrodes and site preparation tools are embedded in or against the soil. For the case of electrodes and site preparation tools fixed to the ice detection system cross at the tip of the robotic arm, vertical motion of the electrodes and site preparation tools is achieved thru movement of the robotic arm itself. If the water ice detection cross is designed with mechanisms to provide movement of the electrodes and site preparation tools relative to the robotic arm, the robotic arm remains fixed in place while the electrodes and site preparation tools are moved down to their final position. For the new, smaller dedicated water ice detection rover spacecraft without a robotic arm, mechanisms are included which provide the vertical motion of the electrodes and site preparation tools relative to the height of the fixed ice detection assembly.

For capacitor like and bullseye like electrodes, where motion of the electrodes relative to the robotic arm is needed, changes in height toward or away from the surface, is achieved by attaching the electrodes to a vertical shaft; a shaft with lengthwise guide striations which passes through a fixed key also containing mirroring striation cutouts. The shaft striations and mirror striation cutouts in the fixed key providing a guide mechanism for the shaft. Vertical motion of the shaft is achieved by a combination of rack and pinion gears attached to the shaft and driven up and down by an attached electric motor. In the case of planar bullseye electrodes, the rack and pinion gears and electric motor combination, which is used to move the electrodes up and down, is also used to apply, as required, downward pressure of the bullseye electrodes against the surface to be tested. A similar system of rack and pinion gears attached to a striated shaft and powered by an electric motor is used on the new, smaller size rover spacecraft without robotic arm for control of the vertical position of the electrodes and site preparation tools. The electric motors used to power the rack and pinion gears are of the dc type and are selected because they produce maximum torque when stalled or slightly less torque at low rotation speeds.

For the case of cylindrical electrodes, a second dc electric motor that drives the cylindrical bit is mounted directly to the striated shaft below the first electric motor. Again the striated shaft is passed through a fixed key bushing to provide a guide for shaft vertical motion. When site cleansing and depression cutting tools are required in separate assemblies, they are attached individually to the drive shaft of a second electric motor located below the key bushing.

It is therefore an objective of the present invention to provide a means to detect water ice on heavenly bodies.

It is a further objective of the present invention that the water ice detection system be divided into two physically separated but electrically connected parts: a water ice detection unit and a water ice detection cross containing water ice detection electrodes along with collocated test sample temperature and thermal conductivity measuring devices and site preparation tools.

It is a further objective of the present invention that the water ice detection unit containing computer, controller, scheduler, memory, stored laboratory data, total impedance measuring device, temperature and thermal conductivity readout equipment, software and UHF transceiver be mounted within the temperature controlled lander spacecraft or rover spacecraft equipment deck (RED) or similar controlled temperature environment.

It is a further objective of the present invention that the water ice detection cross be mounted on the tip of the robotic arm of the lander spacecraft or rover spacecraft vehicle. For a smaller dedicated water ice detection spacecraft without robotic arm, the water ice detection assembly is made integral with the spacecraft.

It is a further objective of the present invention that test site preparation tools used to reveal a potential sample of water ice and collocated on the water ice detection cross with the water ice detection electrodes include a scraper, a cleansing brush and a sawing mechanism for making cuts into the surface of the heavenly body for electrode insertion with all these components part of the water ice detection cross attached to the robotic arm.

It is a further objective of the present invention that the means to detect water ice be based on impedance measurements made by electrically exciting electrodes placed in or against the potential water ice test sample coupled with test sample temperature and thermal conductivity measurements and with the impedance test data forming the required semi-circular water ice signature when transformed into the complex plane as embodied in the reference patent.

It is a further objective of the present invention that it include a way to generate a string of test frequency spans of lower and lower frequencies and a way to select from the generated spans those appropriate for use by the total impedance measuring method as determined from the measured temperature of the prospective water ice sample under test.

It is a further objective of the present invention, that to increase the number of possible successful water ice identification measurements to be made in a given time, that it include a rapid screening method for identifying the possibility that the sample under test has a high probability of being water ice before the more involved sequence of total impedance measurements and their transformation into the complex dielectric plane are employed.

It is a further objective of the present investigation that on the larger class of lander spacecraft and rover spacecraft with robotic arms such as those typified by the Phoenix lander spacecraft and the Spirit and Opportunity rover spacecraft that electrical power for the water ice detection system be provided directly from the lander or rover power supplies.

It is a further objective of the present invention that the water ice detection system which is integral to a smaller, water ice detection rover spacecraft without robotic arm be electrically self powered by solar, battery and/or nuclear sources on that vehicle.

It is a further objective of the present invention that the electrodes used to electrically excite the potential water ice sample be of various embodiments including two facing, flat electrodes of rectangular shape, two facing, segmented cylindrical electrodes or a flat, planar electrode with inner disk and outer ring geometry of bullseye form.

It is a further objective of the present invention that video cameras be provided on the body of the lander spacecraft or rover spacecraft, on the robotic arm if one is utilized to hold the water ice detection cross and on the water ice detection cross itself to view the test site and to be used to control test site preparation and the insertion of the electrodes into or against the potential water ice sample.

It is a further objective of the present invention that the temperature and thermal conductivity of the potential water ice test sample be measured to assist in processing the measured data and in identifying that the test sample is indeed water ice.

It is a further objective of the present invention that the laboratory data carried in the water ice detection unit cover the particular temperature range anticipated for the soil at the site selected for exploration on the heavenly body.

It is a further objective of the present invention that a transceiver system be used on the lander spacecraft or rover spacecraft to transmit and receive updates, data, commands and video to and from the earth via circling satellite relays rather than direct communication from the spacecraft to earth. In one embodiment the transceiver system and associated antenna are of the UHF family.

It is a further objective of the present invention that the water ice detection system electrodes and site preparation tools on a smaller, dedicated lander spacecraft or rover spacecraft without robotic arm be mounted on an integral, movable carriage which employs longitudinal and rotational degrees of freedom to index these components to the same exact measurement site location on the surface of the heavenly body.

It is a further objective of the present invention that the smaller lander spacecraft, rover spacecraft or other spacecraft be equipped with stabilizer mechanisms which are inserted into the surface of the heavenly body to provide restraint against any spacecraft movement during site preparation or electrode insertion operations.

The features and advantages described herein are not all inclusive and, in particular, many additional features and advantages will be apparent to one of ordinary skill in the art in view of the drawings, specifications, and claims. Moreover, it should be noted that the language used in the specifications has been principally selected for readability and instructional purposes, and not to limit the scope of the inventive subject matter.

BRIEF DESCRIPTION OF THE DRAWINGS

The accompanying drawings, which are incorporated into and form part of the specification, illustrate embodiments of the invention and, together with the description, serve to explain the principles of the invention.

DETAILED DESCRIPTION

The present invention is a means to prospect for water ice on heavenly bodies and consists of a water ice detection unit and physically separated but electrically connected water ice detection electrodes and test site preparation tools. The electrodes and site preparation tools are collocated together and mounted on a water ice detection cross attached at the tip of the robotic arm carried by the larger class of rover spacecraft and landers such as the Mars Spirit and Opportunity rovers and Mars Phoenix lander or on a water ice detection assembly integral with a new class of smaller rovers or landers without robotic arms.

Figure 1:
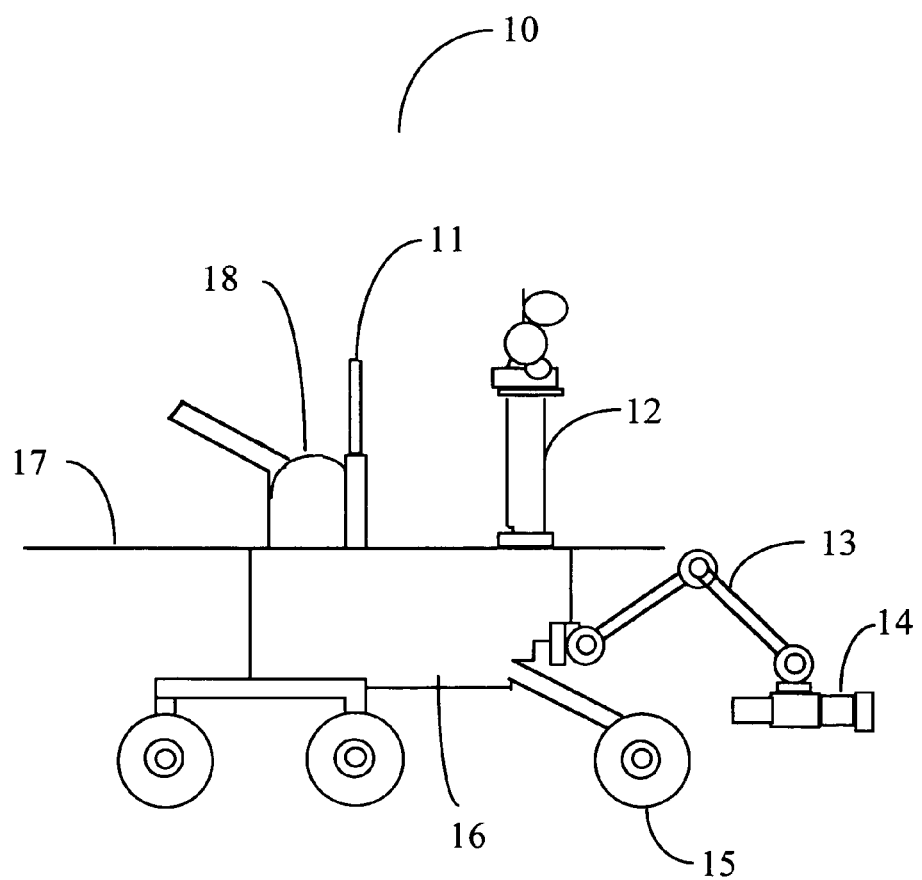
FIG. 1 is a drawing of a side view of the Mars Spirit rover as it presently exists on the surface of Mars.

Referring to the drawings and in particular to FIG. 1, 10, a side view drawing of the Mars Spirit Rover illustrates its configuration as it presently exists on the surface of Mars. It is equipped with a Low Gain Antenna (LGA) 11, a Pancam Mast Assembly (PMA) 12, a Robotic Arm (RA) 13, an Instrumentation Cross (IC) 14 at the tip of the Robotic Arm, a six wheel rocker-bogie mobility system 15, a Warm Electronic Box (WEB) 16, Solar Arrays 17 and a High Gain Antenna (HGA) 18. The Instrumentation Cross 14 contains four scientific instruments: a microscopic imager, a Mossbauer spectrometer, an Alpha particle X-ray spectrometer, and a rock abrasion tool. The Instrumentation Cross is so designed that it can spin through three hundred and fifty degrees in the horizontal plane in the orientation depicted in FIG. 1, 10. The low and high gain antennas, 11 and 18 respectively, allow the rover spacecraft to communicate directly with Earth. A UHF antenna (not shown) allows short range communications to circling relay satellites as another means to transfer data and commands to and from the Mars Spirit Rover and Earth.

Figure 2:
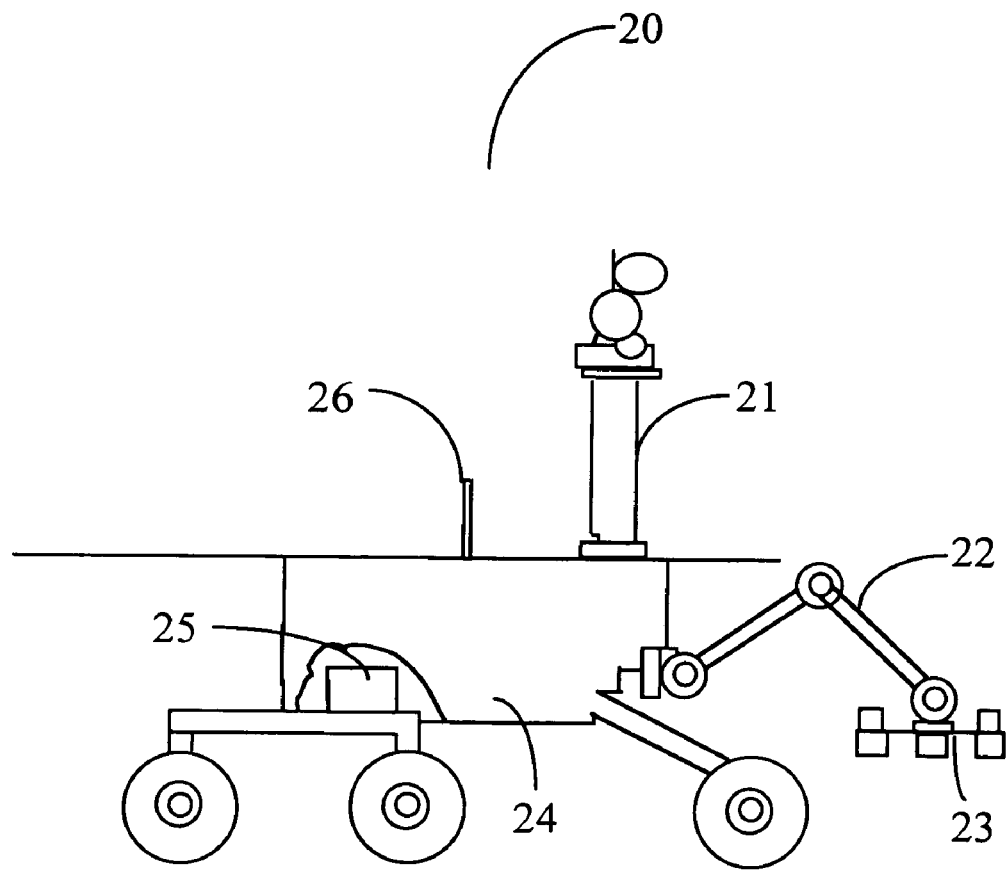
FIG. 2 is a drawing of a side view of the Mars Spirit rover modified for the water ice detection mission with the new water ice detection cross of the present invention mounted at the tip of its robotic arm.

FIG. 2, 20, is a drawing of a side view of the Mars Spirit Rover spacecraft modified for the water ice detection mission of the present invention. The rovers Pancam Mast Assembly (PMA) 21 and its associated equipment are retained as is the Robotic Arm (RA) 22. The new water ice detection cross (WIDC) 23 of the present invention replaces the Instrumentation Cross (IC) at the tip of the Mars Spirit Rover robotic arm. The new water ice detection cross contains the water ice detection electrodes (details not shown) as well as the test site preparation tools (details not shown). The other part of the water ice detection system, the water ice detection unit (WIDU) 25, is mounted inside the body of the rover spacecraft in the existing Warm Electronics Box (WEB) 24 along with an improved UHF transceiver (not shown) and a new external UHF antenna 26.

Figure 3:
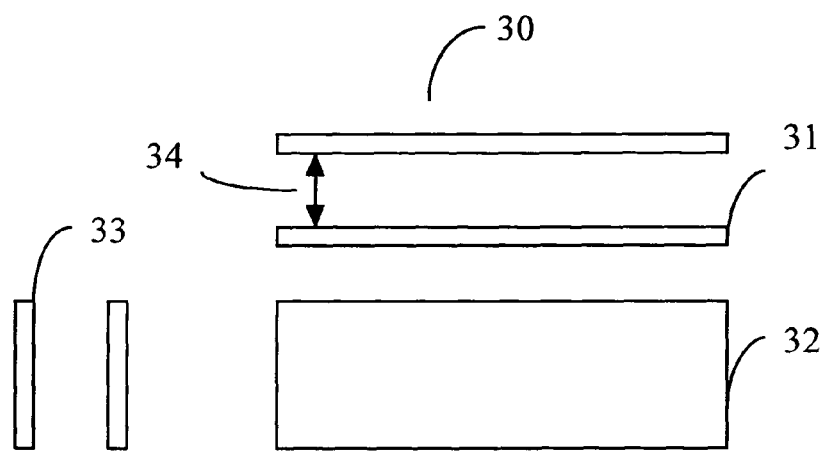
FIG. 3 is a drawing of "capacitor like" water ice detector electrodes of the present invention.

As mentioned earlier in the Summary of the Invention, the water ice detection electrodes mounted in the water ice detection cross may come in a number of configurations including two flat rectangular electrodes that face each other with the test sample between them, two cylindrical segments facing each other again with the test sample between them and a flat annular disk and ring electrode, called the bullseye electrodes, with the test sample pressed under it. FIG. 3, 30, is a drawing of the two facing rectangular electrodes with top view 31, side view 32 and end view 33 shown. The interelectrode distance 34 is also noted for this configuration.

Figure 4:
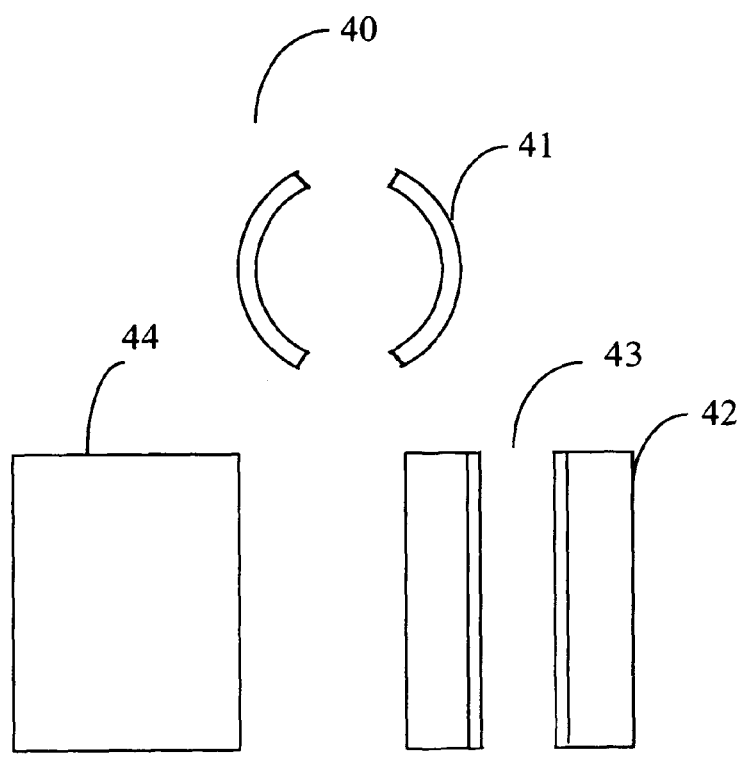
FIG. 4 is a drawing of "circular segment like" water ice detector electrodes of the present invention.
Figure 5:
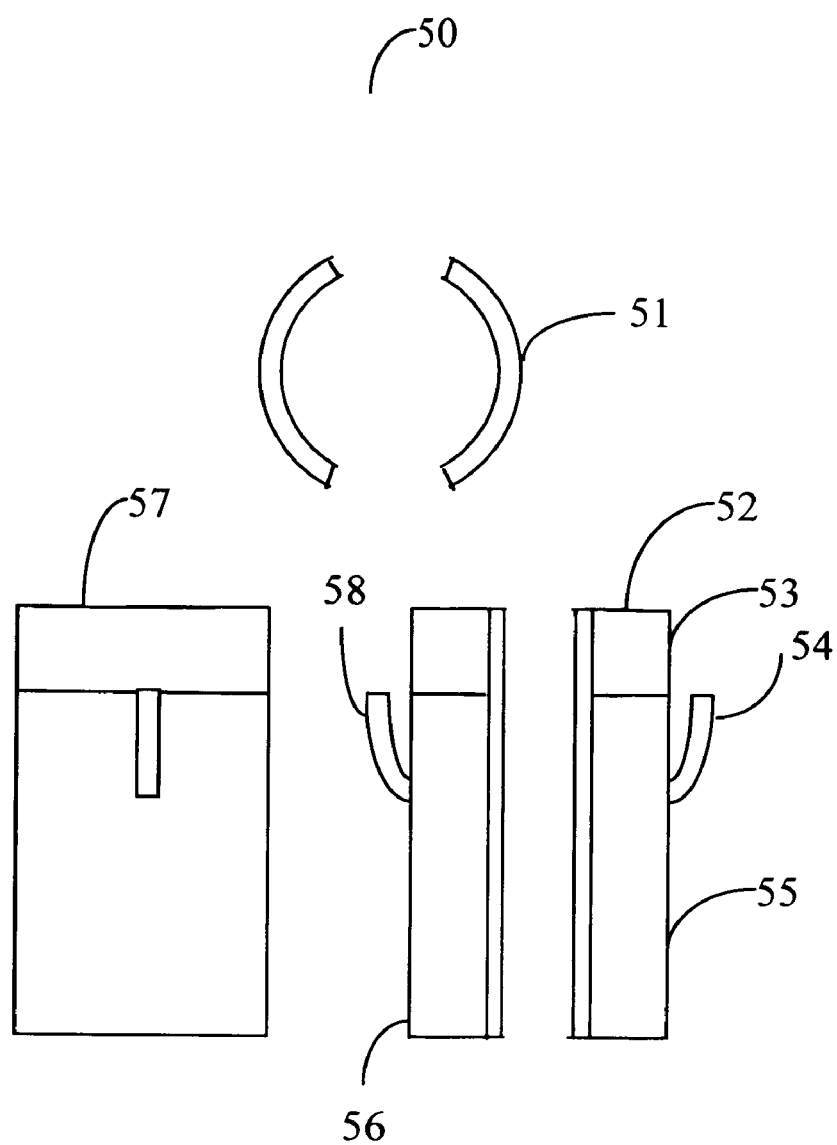
FIG. 5 is a drawing of a cylindrical bit of extended height with integral inner electrodes of the present invention.

A second embodiment for the electrodes is depicted in FIG. 4, 40. FIG. 4, 40, is a drawing that shows segmented cylindrical electrodes between which the test sample is located. A top view 41, a side view 42 showing the gap 43 between facing electrodes, and a second side view 44, rotated ninety degrees from that of 42, are provided. A different embodiment of the cylindrical electrodes is drawn in FIG. 5, 50, for the case where the electrodes are made a permanent part of the interior surface of the cylindrical bit that cuts the depressions with the bit with inner electrodes left in place for the test measurement. FIG. 5, 50 is a drawing that provides a top view 51, a side view 52 and a second side view 57 rotated ninety degrees from that of 52. This version of the segmented cylindrical electrodes has a larger height to diameter ratio then that shown for the electrodes in FIG. 4, 40. The extra vertical height is broken up into two pieces: the basic non-metallic drill 53 which is of full height and a shorter portion of the drill covered on its insides with metal to form the electrodes 55 and 56. Wires 54 and 58 connect the electrodes to the water ice detection unit.

Figure 6:
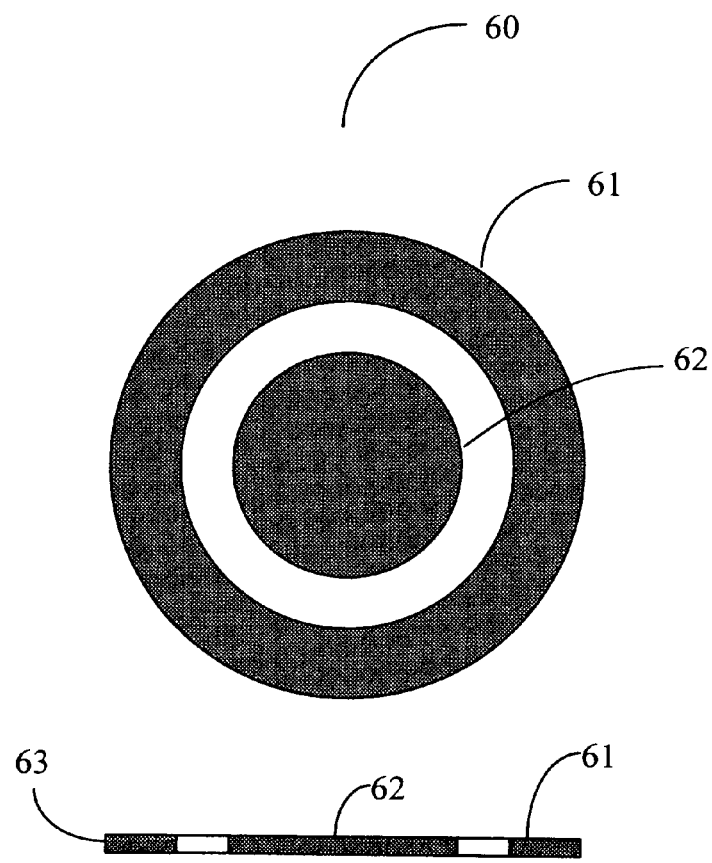
FIG. 6 is a drawing of the flat, bullseye type electrodes of the present invention.

A third embodiment for the electrodes, bullseye electrodes, is drawn in FIG. 6, 60. FIG. 6, 60, illustrates the bullseye electrodes by showing a top view of the exterior annular ring electrode 61 and the center disk electrode 62 along with the flat aspect shape of the bullseye electrodes illustrated by a side view drawing of the electrodes 63. This embodiment of the electrodes is placed against the surface of the potential water ice sample to conduct a test measurement rather than being placed into depressions as done with the other electrode embodiments. The preferred embodiment for the electrode configuration is the initial one described above and labeled as "capacitor like" electrodes because of its well known impedance measuring characteristics.

Figure 8:
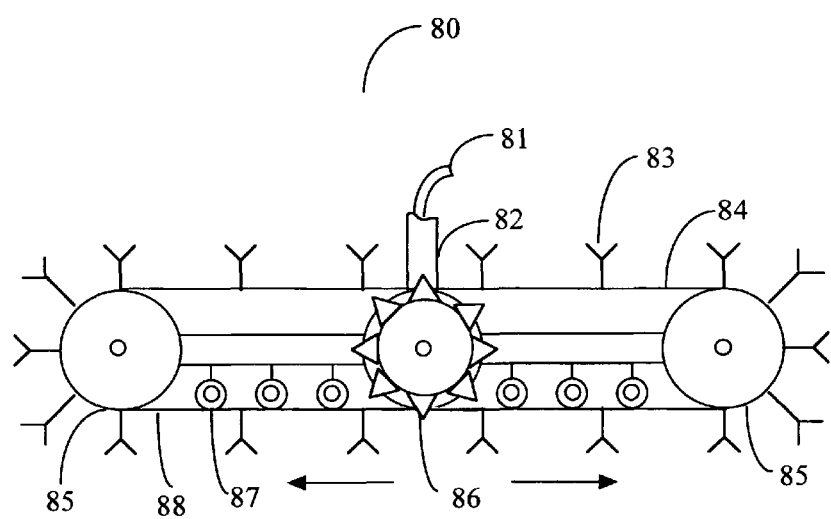
FIG. 8 is a drawing of a second embodiment of a powered test site scraping tool of the present invention which scrapes by linear motion in either of two directions.
Figure 9:
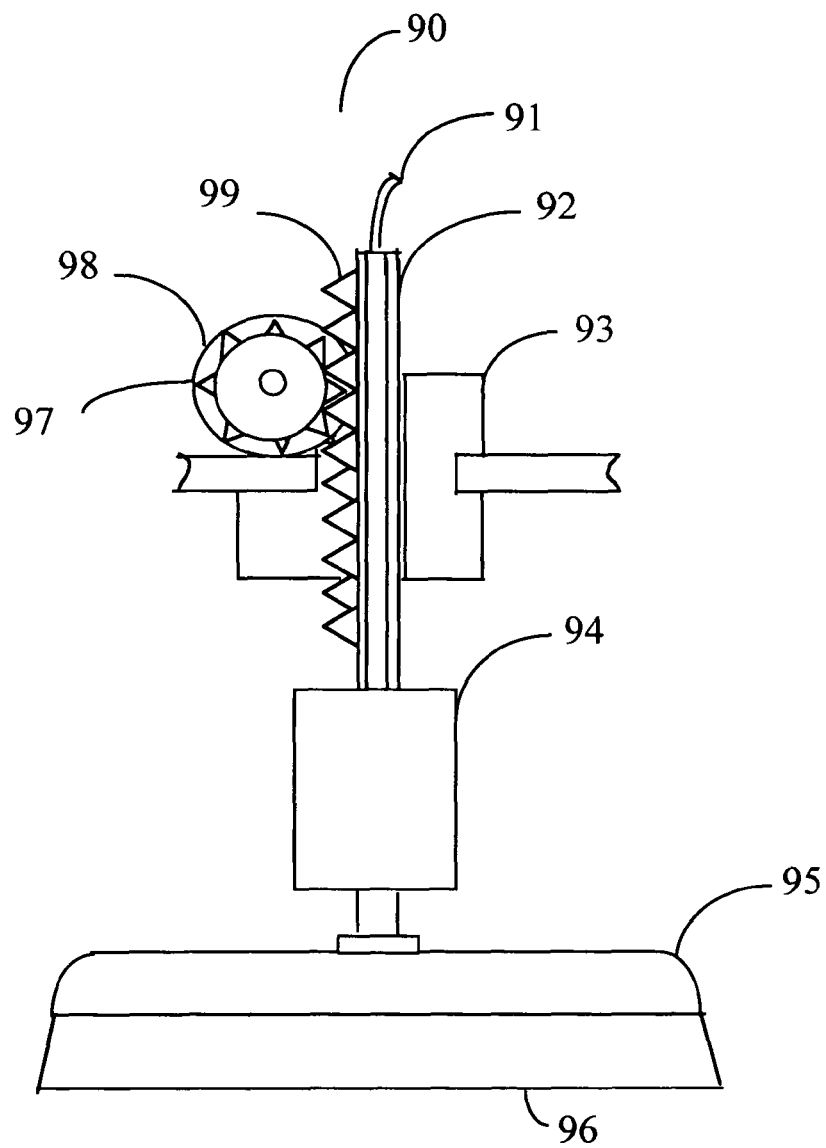
FIG. 9 is a drawing of one embodiment of a powered test site brush cleansing tool of the present invention.
Figure 10:
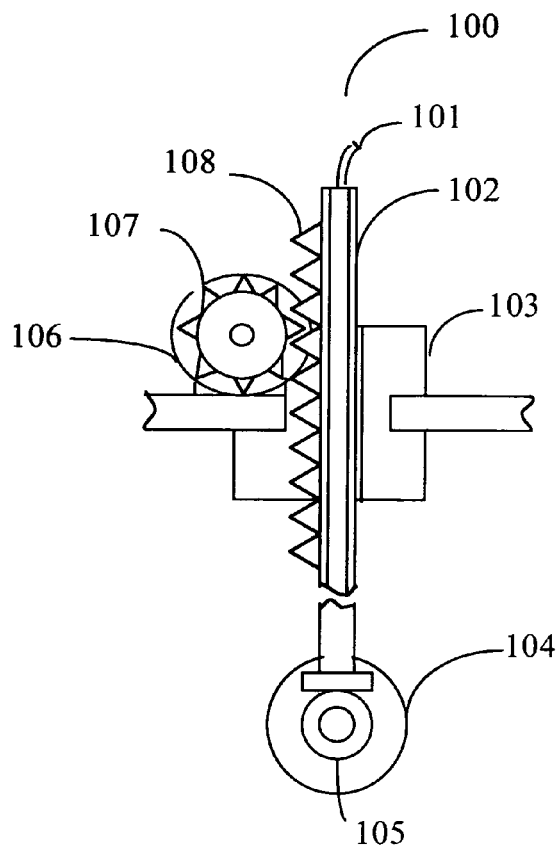
FIG. 10 is a drawing of one embodiment of a powered test site cutter tool of the present invention for making depressions in the surface of the heavenly body for electrode insertion.

The water ice detection electrodes and site preparation tools are mounted on the water ice detector cross. In one embodiment, the site preparation tools include a scraper, FIG. 7 or FIG. 8, to remove overlying material that covers the potential water ice sample, a brush to cleanse the exposed surface after scraping as shown in FIG. 9, and a set of surface cutters, FIG. 10, provided for cutting depressions in the surface for the preferred embodiment of electrodes: the "capacitor like" electrodes. Each of the three site preparation tools is carried on a separate arm of the water ice detection cross. The fourth arm of the water ice detection cross carries the preferred "capacitor like" electrodes, FIG. 11, along with the collocated test sample temperature and thermal conductivity measuring devices. The water ice detection cross is indexed in rotary motion so it can be made to stop repeatedly over the same position following a selected rotation of site preparation tools and/or electrodes.

Figure 7:
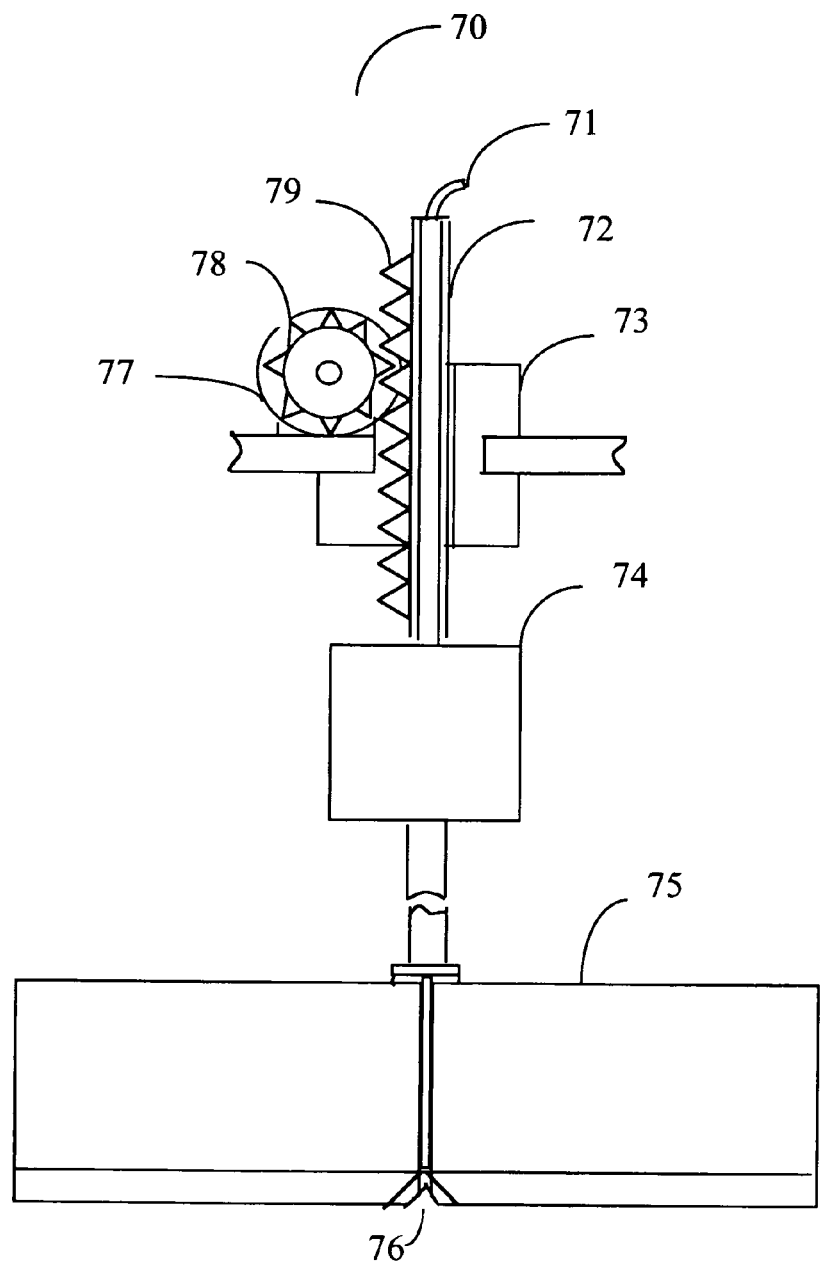
FIG. 7 is a drawing of one embodiment of a powered test site scraping tool of the present invention which scrapes by rotational motion in either of two directions.

The scraping tool depicted in FIG. 7, 70, displaces material covering the potential water ice sample on the surface of the heavenly body to expose it for a test measurement. The embodiment of the scraping tool shown in FIG. 7 scrapes the material away using a rotating scraper 75 which is driven up and down by the combination of dc electric motor 77 and rack 79 and pinion gear 78 with the rack 79 attached directly to the striated shaft 72. The striated shaft 72 passes through a guide block 73 containing a mirroring striated shaft cutout (not shown); the striated block with mirrored striated cutouts acting as a guide for the striated shaft 72. Below the first dc motor 77, there is a second dc motor 74, attached at the bottom end of the vertical shaft 72, which powers the scraper. The second dc electric motor 74 rotates the scraper 75 in either the clockwise or counterclockwise direction as commanded.

The scraper in FIG. 7 is equipped with an upside down y-shaped edge 76 of hardened metal or ceramic material such as silicon carbide. The upside down y-shaped edge allows the scraper to efficiently remove surface material when it revolves in either direction of rotation. The cross tines of this scraper embodiment may be more numerous than shown in FIG. 7 and may be curved (not shown) in the radial direction to enhance lateral movement of the scraped material.

Other scraper designs are possible that operate to scrape material in a single direction. Such an embodiment is pictured in FIG. 8, 80, where a belt 84, equipped with numerous scrapers 83 attached to the belt on its outer surface and running from one side of the belt to the other, move continuously around a set of rollers 85 and 87. The belt is driven by a centrally mounted, geared, reversible dc electric motor 86. Electric power for the dc motor 86 is carried to it by a wire 81 passing thru the hollow support shaft 82. The lower horizontal surface 88 with scrapers is pressed against the surface of the heavenly body during the scraping operation. The direction of scraper motion is reversible and the individual scrapers are equipped with a y-shaped lower tip of hardened metal or ceramic material to facilitate scraping in either direction. The vertical position of the scraper, FIG. 8, is driven by the same combination of dc electric motor (not shown) and rack and pinion gear (not shown) as utilized in FIG. 7 to accomplish the same task.

FIG. 9, 90, presents an embodiment for an electrically powered brush for cleansing the test site after it is scraped. FIG. 9, 90, depicts a dc motor 94 which drives brush 95 composed of various metal and non-metallic bristles 96. The vertical position of the brush is controlled by a dc electric motor 98, rack 99 and pinion gear 97 combination (not shown) as noted earlier in FIG. 7 for the rotary scraper. The striated shaft 91 is again passed thru a mirrored striated cutout in support block 93; the cutout providing a guide for vertical shaft motion. The second electric motor 94 powers the brush with electric power carried to it thru wire 91 which runs inside the hollow shaft 92.

FIG. 10, 100, is a drawing that illustrates an embodiment for the electrode cutter apparatus. FIG. 10, 100, shows a dc electric motor 105 driving a dual (not shown) cutter arrangement 104 appropriate for cutting depressions in the cleansed surface of the heavenly body for "capacitor like" electrodes. It consists of two circular, cutter saws 104 which are driven by a dc electric motor 105 placed between the saws. For cases where the desired interelectrode distance between the dual saws is smaller than allowed by the width (not shown) of the electric motor 105, the drive motor 105 is repositioned vertically above the dual cutters and powers the dual saws via a transmission and drive shafts connected to each cutter. The transmission set-up (not shown) carries drive motor 105 shaft revolutions to the cutter wheels. A dc electric motor 106, rack 108 and pinion gear 107, striated shaft 102 with attached rack and mirrored striated support block 103 are again used to drive and guide the striated shaft with attached cutters up and down. Electric power to the cutter motor 105 is carried via wire 101 running thru the hollow shaft 102.

Figure 11:
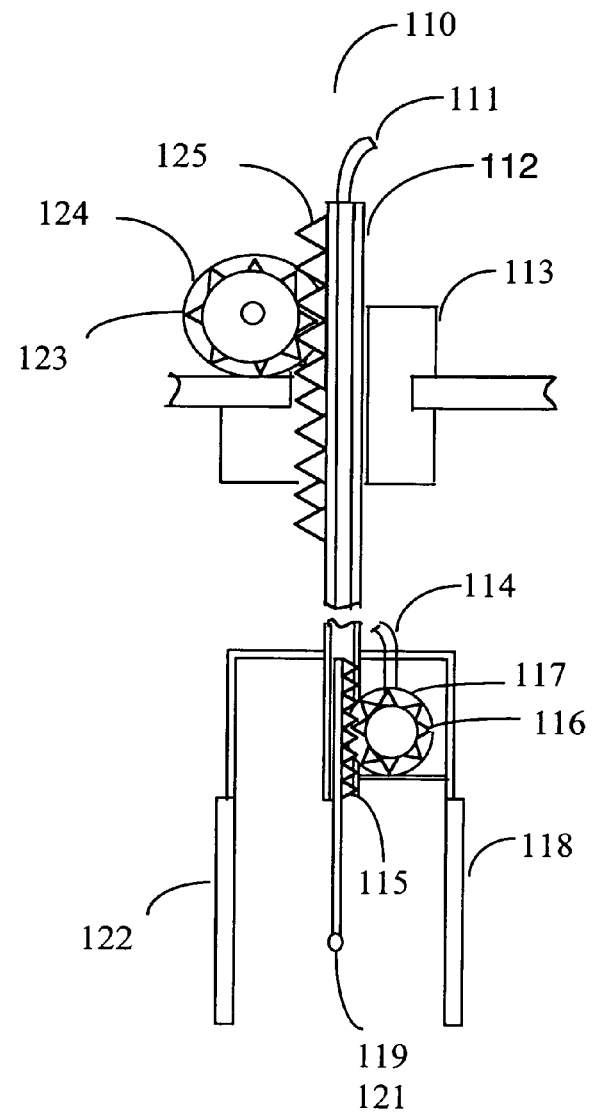
FIG. 11 is a drawing of an end view of an embodiment of shaft mounted "capacitor like" electrodes with collocated temperature and thermal conductivity measuring devices of the present invention.

FIG. 11, 110, is a drawing of an end view of dual flat "capacitor like" electrodes, 118 and 122 respectively, with collocated temperature 119 and thermal conductivity 121 measuring devices. The electrodes, 118 and 122, are driven up and down by the dc electric motor 124 whose drive shaft is connected to a pinion gear 123 and thence to a rack 125 attached to the vertical striated shaft 112. A mirrored striated cutout in block 113 guides the shaft during up and down motion. The electrodes, 118 and 122, are inserted into depressions cut into the exposed, cleansed surface for a test measurement. After the electrodes are inserted, the temperature and thermal conductivity measuring devices are driven down into the potential water ice sample and their measurements are made. They are removed prior to the impedance measurements that follow. The dc motor 126, thru connection to rack 115 and pinion gear 116, moves these devices up and down. Electric power is brought to electric motor 126 thru wire bundle 111 inside the striated shaft 112 with total impedance signals returning thru other wires in the bundle.

Figure 12:
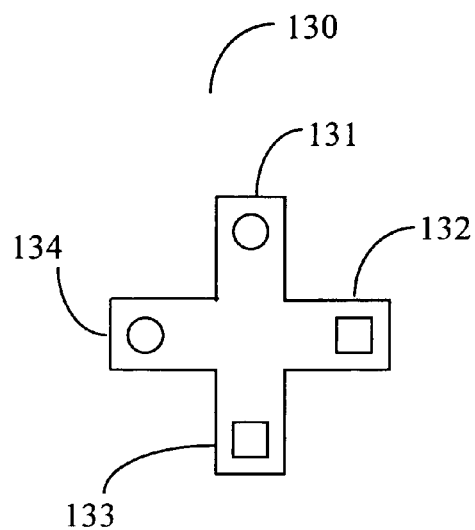
FIG. 12 is a drawing of a view from above of a water ice detection cross of the present invention that rotates in the horizontal plane during operation for water ice detection.

FIG. 12, 130, is a drawing of how the three site preparation tools and water ice detection electrodes are mounted, one tool on each of the three arms of the water ice detection cross with the electrodes on the fourth arm, when viewed from above. The brush 131 is on the uppermost arm in drawing 130, with the electrodes 132 mounted on the right arm, the cutters 133 mounted on the bottom arm and the scraper 134 on the left arm.

Figure 13:
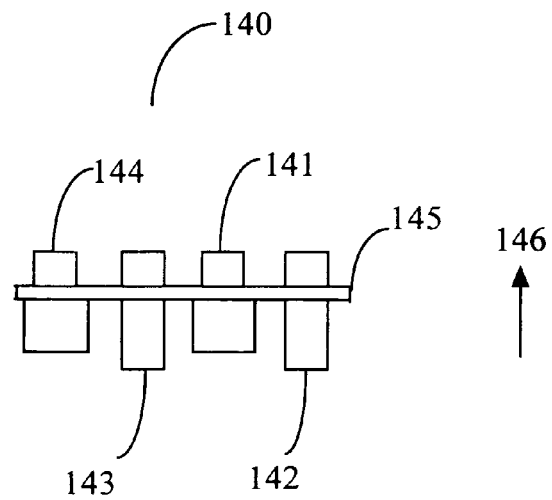
FIG. 13 is a drawing of a side view of the water ice detection of the present invention that rotates in the horizontal plane during operation for water ice detection.

FIG. 13, 140, is a drawing of the water ice detection cross when viewed from, the side for a water ice detection cross configuration that is to be attached horizontally to the robotic as shown earlier in FIG. 2. FIG. 13, 140, shows that the active ends of the site preparation tools and electrodes hang down below the flat cross structure 145 with the direction of the vertical plane noted by the double arrow 146 on the right side of the drawing.

FIG. 12 and FIG. 13, which are not to scale, show an overview of the locations of the site preparation tools and electrodes on the water ice detection cross only and as such do not replicate the details of the tools or electrodes; just their locations. Liberty is also taken in FIG. 13 with respect to the spacing between the tools and electrodes for illustrative purposes. Thus the brush 141 that is normally hidden in the side view 140 behind the cutter 143 is shown exposed. In FIG. 13, the electrodes 142 are shown to the right of brush 141 and the scraper 144 is shown to the left of the cutter 143. The water ice detection cross in FIG. 13 rotates in the horizontal plane to accomplish the site scraping, cleansing, depression cutting and electrode insertion operations and the rotation is indexed so that the preferred "capacitor like" electrodes are placed directly in the depressions cut into the prepared surface.

Figure 14:
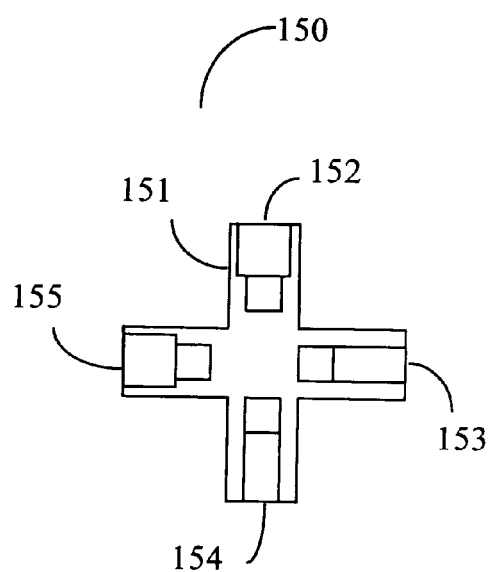
FIG. 14 is a drawing of a view from above of a water ice detection cross of the present invention that rotates in the vertical plane during operation for water ice detection.
Figure 15:
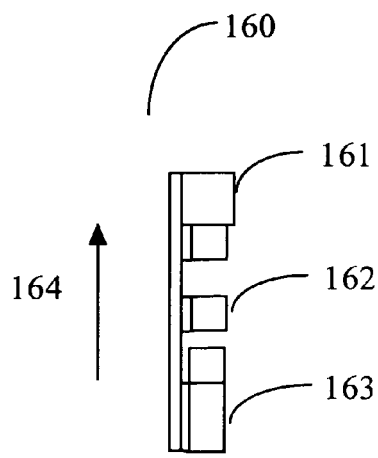
FIG. 15 is a drawing of a side view of the water ice detection cross of the present invention that rotates in the vertical plane during operation for water ice detection.

The water ice detection cross may also be designed to rotate in the vertical plane to accomplish the site preparation and electrode insertion at the test site. A view from above of such a cross design is provided in FIG. 14, 150, with positions noted for the brush 152, electrodes 153, cutters 154, and scraper 155. Each of these devices lies on its side against the cross structure 151 in this design. A side view, looking up, of this design is provided in FIG. 15, 160, with the direction of the vertical plane indicated by the arrow symbol 164. The locations of the scraper 161, the cutters 162 and the electrodes 163 are noted. This cross rotates around the horizontal axis to conduct its operations and the site preparation tools and electrodes are extended radially out and retracted radially in for each individual operation. The rotation is again indexed to place "capacitor like" electrodes directly in the depressions cut into the prepared surface. The cross shown in FIG. 14 and FIG. 15 is also mounted at the tip of a robotic arm. Though the water ice detection cross is shown to rotate in the horizontal plane in FIG. 12 and rotate in the vertical plane in FIG. 14, either approach may also be designed to work in any angled plane between the two extremes, if desired.

The height of the scrapers, FIG. 7 and FIG. 8, the brush FIG. 9, the cutter FIG. 10 and the electrodes FIG. 11 with respect to the supporting cross or to the surface of the heavenly body is obtained visually from cameras or their equivalent placed on the rover vehicle itself, cameras on the robotic arm supporting the water ice detection cross and cameras on the cross itself and by sensors such as feeler gages (not shown) attached to the cross structure and touching the surface below. The vertical position of each tool and the electrodes with respect to the water ice detection cross is also determined from the number of rotations that the vertical drive motor has undergone using a motor rotation readout device (not shown) or equivalent attached to the shaft of the electric motor.

Detection of water ice material is accomplished as described in the reference patent U.S. Pat. No. 7,439,877 whereby the potential water ice sample is excited electrically at a set voltage over a band of frequencies and the corresponding total impedance of the sample is measured at each test frequency. The embodiment for the impedance measuring device is the Analog Devices Model AD5933, "IMSPS, 12-Bit Impedance Converter, Network Analyzer AD5933 chip whose characteristics and operation are described in the reference patent. The prospective water ice sample's temperature and thermal conductivity is measured before and after each frequency scan with the measured temperatures used to support data reduction and the thermal conductivity values compared to known values for water ice at the same test temperatures and carried in memory on the spacecraft to support the confirmation or rejection of the sample as water ice. The temperature and thermal conductivity of the potential water ice sample are measured in an embodiment of the present invention with glass encapsulated, self heated thermistors and for this approach, the effective thermal conductivity is calculated using the equation, Column 11: lines 31 thru 37 in the reference patent. It should be noted that there are a number of other embodiments that may be used to measure the temperature and thermal conductivity of the water ice sample other than the use of glass encapsulated, self heated thermistors.

The Analog Devices Model AD5933 chip is used to make total impedance measurements over a particular band of test frequencies corresponding to the measured temperature of the prospective water ice sample under test. The particular span of test frequencies is in turn selected from a series of sub-spans by dividing the chips master clock frequency down in steps. The frequency may be divided down by several different approaches including using a series of frequency lowering devices such as the Philips 74HC74 flip flop or an Analog Device AD9834 acting as a binary clock divider with a high speed comparator on its output to scale the clock frequency down in steps by a constant factor.

Equations in the reference patent for "capacitor like" electrodes contained in Column 14: lines 58 thru 63, Column 15: lines 3 thru 8, Column 15: lines 14 thru 28 and Column 15: lines 41 thru 44 are used in the present invention for "capacitor like" electrodes to convert the measured total impedance scan data to complex dielectric property data in the form of epsilon prime; the ordinary relative permittivity of water ice and epsilon double prime; the dielectric loss factor for water ice. The characteristic signature of water ice is a semicircle in the epsilon prime/epsilon double prime dielectric space as demonstrated by the equation, Column 15: lines 41 thru 44 in the reference patent. When the intrinsic semicircular signature for water ice, called a Cole-Cole plot, is observed in any test measurement, its presence is taken as absolute proof that a sample is water ice.

That the prospective water ice sample is water ice is double checked using a method also discussed in the reference patent. This procedure is based on the observation noted in the reference patent that a single, common vector originating on the epsilon prime axis at the quarter diameter point of the semicircular trace and passed through the 1000 Hz frequency point of the complex dielectric trace measurements by R. P. Auty at −10.8 C. for pure glaze ice makes an angle of 28.5 degrees with respect to epsilon prime axis and remains at that angle at any other temperature if the product of omega times tau sub D is taken to have the same value at any other temperature as it had at −10.8 C.

This feature for water ice of constant angle for a vector in complex dielectric space for measurements taken at the same value for the product of omega times tau sub D is also used in the present invention as a rapid screening method for identifying the possibility that the prospective water ice sample under test is water ice. Use of this simple screening method allows only those samples with higher probability of being water ice to be subjected to the more involved test sequence employing measurement of a complete total impedance data set followed by its transformation into complex dielectric space and the determination of whether it does or does not exhibit a semicircular shaped trace required if it is indeed water ice.

Figure 16:
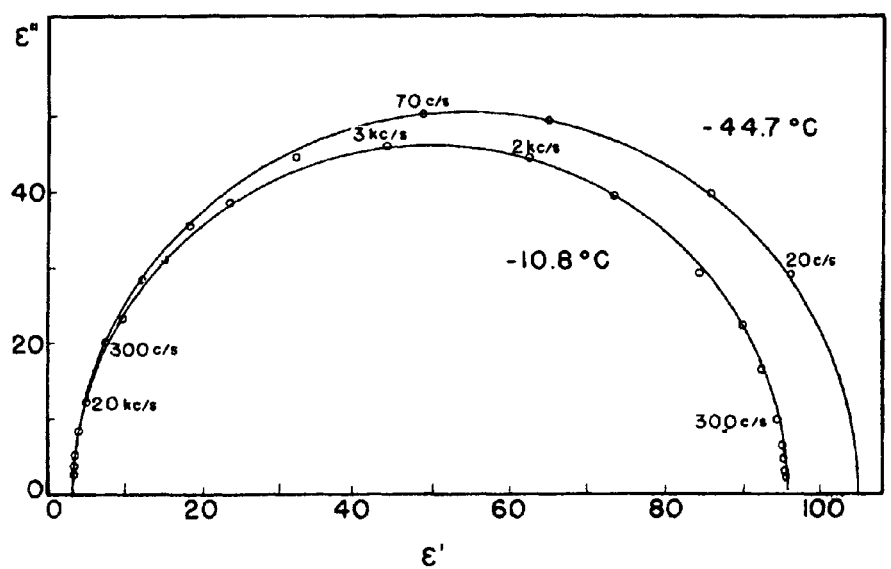
FIG. 16 is a graph of "complex dielectric plane" loci for water ice at T=−10.8 C. and T=−44.7 C.

Laboratory experiments, carried out by R. P. Auty in 1951 for his PhD thesis entitled "Dielectric Constants of Solid H2O and D2O", obtained data in agreement with the equations and with the Cole-Cole semicircular shape mentioned above. Data measured by R. P. Auty covered the temperature range from −1.5 C. to −50.6 C., in particular at T=−1.5 C., T=−10.8 C., T=−16.3 C., T=−27.5 C., T=−37.6 C., T=−44.7 and T=−50.6 C. Data at T=−10.8 C. and at T=−44.7 C. is shown in FIG. 16 with the intrinsic semicircular shape for water ice preserved over this temperature range. The data by R. P. Auty also demonstrated that the semicircular shape for water ice is preserved (not shown) for water ice samples containing cracks and or flaws as well as for samples having higher electrical conductivity than standard water ice with the only effects observed being a change in size of the semicircular shape but no changes in it semicircular form. This characteristic of inviolate semicircular shape in the dielectric loss factor/relative permittivity plot, a Cole-Cole plot, for water ice will also be true on any heavenly body whose exposed and tested surface is water ice. Any minute amount of soil that overlays the test sample will not effect the impedance measurement to any significant degree for such soil lies on the upper surface of the test sample and in a region essentially outside the main electromagnetic field between the "capacitor like" or cylindrical element electrodes. If the sample is water ice, the minute amount of soil present on its surface, if any, will have an effect similar to a crack or a flaw in the water ice as observed by R. P. Auty. It will have no effect on the intrinsic semicircular shape for water ice in the complex plane and little, if any, effect on making the diameter of the semicircular trace smaller. Algorithms that recognize the effects of slight amounts of contaminating soil are exercised during data reduction.

The band of excitation frequencies used in the impedance test depends on the measured temperature of the potential water ice sample being tested. The peak of the semicircular trace is known to occur at a product of omega times tau sub D equal to unity where omega is equal to 2 pi times the excitation frequency and tau sub D is the Debye relaxation time. R. P. Auty measured the parameter tau sub D in his thesis and found that tau sub D was a strong function of temperature: changing dramatically as the temperature is lowered. Tau sub D was found to vary from 2.5×10 to the minus 5 seconds at T=−1.5 C. to 5.6× to the minus 3 seconds at T=−50.6 C. Thus the excitation frequency has to be lowered by a factor of 224 from the frequency corresponding to the peak of the semicircular trace at −1.5 C. in order to maintain the constant product of omega times tau sub D equal to unity as needed for the new peak at the lower temperature.

It is possible to determine that a semicircular trace exists in the complex dielectric plane using data for less than a complete semicircle by fitting the available set of complex dielectric plane data with an equation that demonstrates that it is semicircular in form and that also shows it has intersections with the horizontal relative permittivity axis at values near those of water ice at zero excitation frequency and at a very high excitation frequency. The values of relative permittivity at zero frequency and at very high frequency do not change significantly with temperature being 95.0 and 3.08 respectively at T=−10.8 C. and 98.5 and 3.0 at T=−37.6 C. Using a partial trace to demonstrate a semicircular form reduces the range in frequencies needed to be used for the total impedance measurements.

The new, smaller, water ice detection rover or lander spacecrafts dedicated to water ice prospecting are envisioned to be half the size or smaller than the Mars Spirit and Opportunity rovers or Mars Phoenix Lander and without robotic arm. The water ice detection system is integral with the layout for this smaller spacecraft and an example of such a rover is offered in FIG. 17, 170 which is a drawing of a segmented, folded version of the earlier rotating cross of FIG. 14 and FIG. 15 integral to the carriage; the carriage moving horizontally and rotating as noted in the vertical plane.

Figure 17:
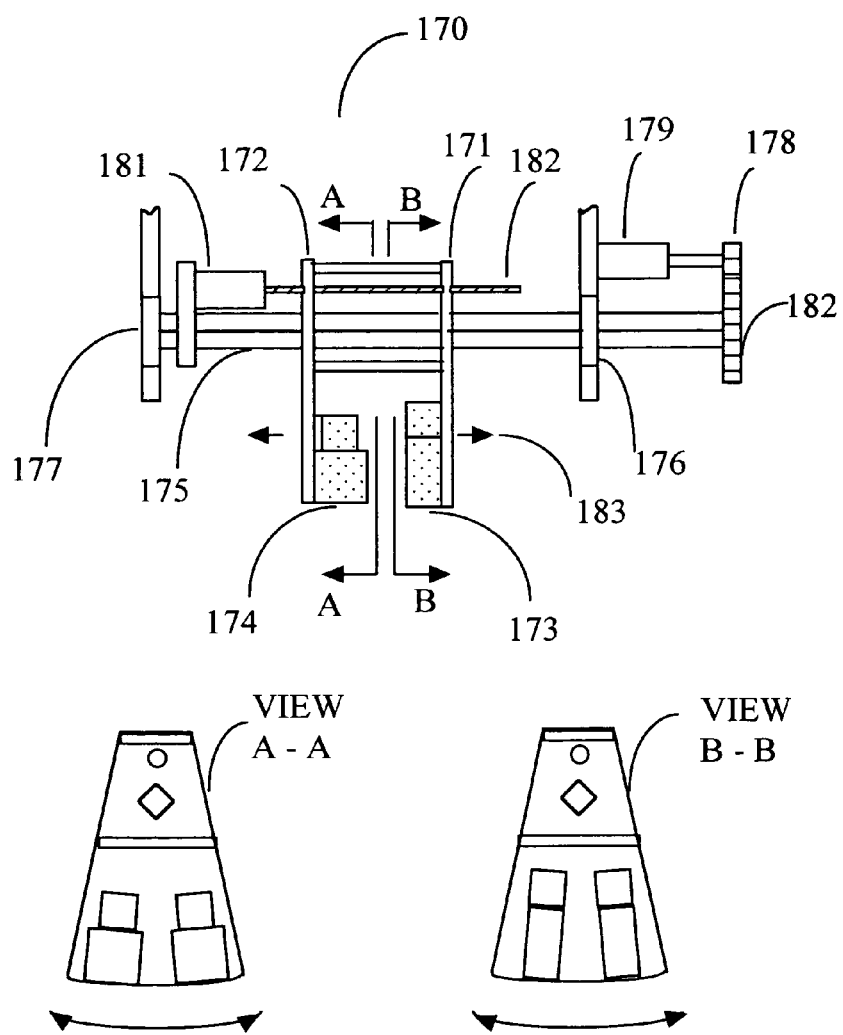
FIG. 17 is a drawing of the site preparation tools and electrodes mounted on a folded water ice detection cross which is supported from a movable carriage for the new, smaller, dedicated water ice prospecting rover spacecraft of the present invention and showing the manner in which the carriage may be driven horizontally and the cross rotated vertically.

The site preparation tool and water ice detection electrode assemblies are mounted in FIG. 17, 170, on two separate, paddle like planar structures 171 and 172: the paddle structures are spaced apart, face each other, and are connected to each other. Two site preparation tool assemblies are attached to the face of the left paddle structure 172 and the third site preparation tool assembly and the water ice detection electrode assembly are attached to the face of the right paddle structure 171. The site preparation tool and water ice detection electrode assemblies are those shown earlier in FIG. 7, FIG. 9, FIG. 10 and FIG. 11. The ends of the site preparation tools and water ice detection electrodes are mounted at the edges of the paddle structures, View A-A and View B-B, 170, to allow the site preparation tools (not shown) and water ice detection electrodes (not shown) to be projected radially outward from within the shrouds (not shown) that surround them to carry out their assigned tasks on the surface of the heavenly body and then to be retracted radially back into the shrouds.

The two paddle like structures are mounted on a striated shaft 175 which passes perpendicularly through them in the horizontal direction. The striated shaft is supported on its ends by bearings 176 and 177, respectively, fixed to the spacecraft which allow the shaft 175 to rotate around a line drawn lengthwise through the center of the striated shaft. As shown in FIG. 17, 170, a gear 182 is attached to right end of the striated shaft and is rotated by the motor gear combination 179 fixed to the spacecraft. The dc motor gear combination 179 rotates the striated shaft 175 and the attached segmented paddle like structures 171 and 172 move in response in the vertical plane. In addition, the two paddle like structures, which are connected together, are driven along the striated shaft by a reversible, dc, geared electric motor 181 which powers an extended length, worm gear shaft 182. The worm gear shaft 182 passes thru fixed gears (not shown) in each of the paddle like structures. When the worm gear 182 is activated, it causes the two paddle structures to move along the striated shaft in either horizontal direction depending on the direction of rotation of the dc electric motor.

The mechanical arrangement in FIG. 17, 170, provides a means to rotate the site preparation tools and water ice detection electrode assemblies attached to the paddle like structures in the vertical plane and also a means to move them horizontally with respect to the test site measurement point. After each tool or electrode sensor is moved to the desired perpendicular position above the measurement point by the required linear and rotational movements, the selected tool or electrode sensor is driven radially out of its shroud (not shown) and placed against the surface of the heavenly body to carry out its assigned task. The tool and electrode sensor positions are indexed to the desired measurement point which allows the electrode sensor to be inserted without error directly into the final cuts made in the cleansed surface. After insertion of the electrode sensor, a test measurement sequence follows.

Figure 18:
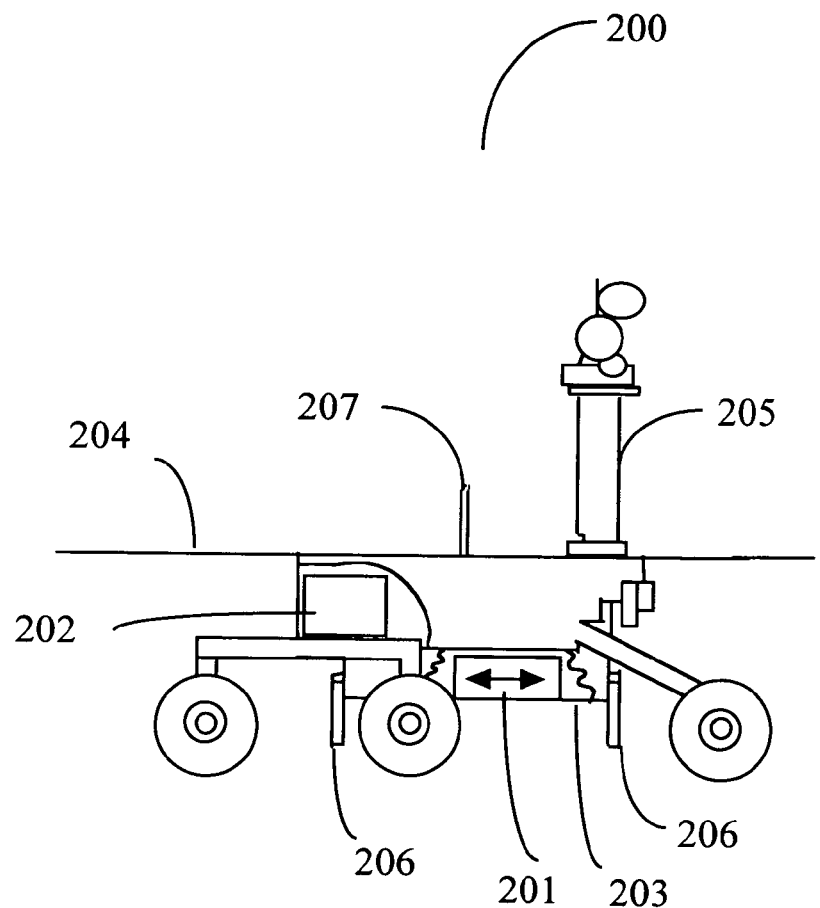
FIG. 18 is a drawing of the new, smaller, dedicated water ice prospecting rover spacecraft of the present invention equipped with stabilizers about its perimeter.

FIG. 18, 200, is a drawing of a smaller, dedicated water ice detection Mars Spirit-like rover spacecraft within which the tool and electrode supporting carriage has been mounted. The carriage is centrally positioned below the main body of the spacecraft as shown by 201 in FIG. 18 with the water ice detection unit 202 positioned in the temperature controlled space 203. A solar cell panel 204 mounted on top of the rover spacecraft and covering nearly the complete flat top of the spacecraft powers this spacecraft embodiment. The solar cell panel 204 extends further to the front of the spacecraft then that used on the full size Spirit design. The Pancam 205 has been scaled down in size from the unit used on the full scale MARS Spirit Rover spacecraft. A UHF antenna 207 of improved design is mounted on top of the rover spacecraft and used for communications with relay satellites passing overhead.

Stabilizers 206 are placed at several locations on the perimeter the smaller, dedicated water ice detection Mars Spirit-like rover spacecraft as shown in FIG. 18, 200. These stabilizers are deployed before each test measurement series and provide a means to overcome any forces or moments produced during cleansing of the test site or insertion of the water ice detection electrodes into the cleansed surface and keep the spacecraft absolutely fixed in place during these operations and during the tests that follow. Several embodiments are possible for the stabilizers 206 including the use of drills to form holes in the heavenly body surface material into which stabilizers are inserted or the use of flanged anchors that are twisted down into the surface material to provide the desired anchoring effect.

The foregoing description of the embodiments of the invention has been presented for the purposes of illustration and description. It is not intended to be exhaustive or to limit the invention to the precise form disclosed. Many modifications and variations are possible in the light of this disclosure. It is intended that the scope of the invention be limited not by this detailed description, but rather by the claims appended hereto.

I claim:

1. Water ice detection apparatus for prospecting for water ice and accomplishing water ice detection in the vicinity of a surface of a heavenly body, the apparatus comprising: a lander spacecraft, a rover spacecraft or an instrument positioned by an astronaut, the lander spacecraft and the rover spacecraft being like the Mars Phoenix lander and the Mars Spirit and Mars Opportunity rovers, respectively; the latter with their six bogie-wheel support system and navigation system, the apparatus equipped with a robotic arm or with a moveable carriage, the apparatus including a water ice detection system and test site preparation tools which are used at a prospective measurement site for measurement site preparation and are attached to the robotic arm, moveable carriage or directly to the apparatus, the site preparation tools being a motor driven scraper, a motor driven brush and a motor driven cutter, the test site preparation tools and a water ice detection sensor with water ice detection electrodes and temperature and thermal conductivity probes are parts of the water ice detection system, the test site preparation tools, water ice detection sensor and temperature and thermal conductivity probes attached to the apparatus at the robotic arm's free end in the form of a water ice detection cross structure or suspended from the moveable carriage on extensible arms, the remainder of the water ice detection system being a water ice detection unit fixed in position on the apparatus, the test site preparation tools used to remove overlying material on the surface of the heavenly body to expose a prospective water ice test sample at a test site measurement point for a water ice detection measurement, water ice detection achieved thru measurements of a prospective water ice test sample's temperature, thermal conductivity and variation of total impedance with electrical excitation frequency followed by transformation of total impedance data into complex dielectric values using an algorithm, confirmation that a prospective water ice test sample is water ice when a semi-circular shaped trace is found in complex dielectric space with size in agreement with on-board stored data in an on-board special purpose computer, total impedance data measured by an electronic chip embodied in one form as a Analog Device Model AD5933 Network Analyzer chip and:

said water ice detection system mounted on a lander spacecraft, rover spacecraft or in an instrument positioned by an astronaut on the surface of the heavenly body, said water ice detection physically separated into two parts: said water ice detection unit and second part: site preparation tools, water ice detection sensor and temperature and thermal conductivity probes; the first part and second part electrically connected to each other, said water ice detection unit containing a special purpose computer with dedicated algorithims, a controller, data storage, and a communication transceiver, said water ice detection unit mounted in a controlled temperature environment on said lander spacecraft, rover spacecraft or astronaut positioned instrument, said test site preparation tools comprising first, a motor driven scraper, second, a motor driven brush and third, a motor driven cutter wherein:
(a) said first scraper, used to remove overlay on the surface of the heavenly body covering the prospective measurement site and the prospective water ice test sample, and
(b) said second brush, for cleaning the exposed surface after removing the overlying material, and
(c) said third cutter, for making impressions in the cleansed surface into or upon which a portion of said water ice detection sensor is placed, said water ice detection sensor equipped with electrodes that are placed into or upon said cleansed surface of said heavenly body along with the temperature and thermal conductivity measuring probes to make prospective water ice test sample measurements by:
(a) using said electrodes to electrically excite said prospective water ice test sample over a range of frequencies at a voltage, and
(b) measuring the total impedance of said prospective water ice test sample at each frequency with an impedance measuring device connected to said electrodes; one embodiment of said impedance measuring device being the Analog Device Model AD5933 Network Analyzer chip, said test site preparation tools and said water ice detection sensor mounted at the tip of a robotic arm of said lander spacecraft or rover spacecraft or astronaut positioned instrument if equipped with said robotic arms, or attached to a moveable carriage integral to said lander spacecraft, rover spacecraft or said astronaut positioned instrument if it is without said robotic arm.

2. The water ice detection apparatus recited in claim 1 for said lander spacecraft or rover spacecraft or astronaut positioned instrument with said robotic arm where said test site preparation tools, said water ice detection sensor, and said temperature and thermal conductivity measuring probes are mounted on a water ice detection cross structure at the tip of the robotic arm comprised of several arms wherein:
(a) on the cross structure's first arm, is mounted said motor driven scraper,
(b) on the cross structure's second arm, is mounted said motor driven brush,
(c) on the cross structure's third arm, is mounted said motor driven cutter,
(d) on the cross structure's fourth arm, are mounted said water ice detection sensor and said temperature and said thermal conductivity measuring probes with said first, second, third, and fourth arms able to be moved and/or rotated in either the horizontal plane, the vertical plane or in a tilted plane, and
(e) with each of the test site preparation tools and water ice detection sensor with temperature and thermal conductivity probes mounted on extensible motor driven mechanisms that separately move each of the tools, water ice sensor and temperature and thermal conductivity probes with respect to the surface of the heavenly body; up, down, against and into the heavenly body surface.

3. The water ice detection apparatus recited in claim 1 for said lander spacecraft or rover spacecraft or astronaut positioned instrument, all without said robotic arms wherein:
(a) said test site preparation tools, said water ice detection sensor and said temperature and thermal conductivity probes are mounted on a carriage which is integral to the spacecraft, and
(b) said carriage is capable of linear motions and rotational motions with respect to the spacecraft and is driven to place each of said test site preparation tools or said water ice sensor and probes exactly over the test site measurement point in an indexed manner.

4. The water ice detection apparatus recited in claim 1 for said lander spacecraft or rover spacecraft or astronaut positioned instrument, each equipped with said robotic arms wherein:
(a) said robotic arm may be moved during measurement site preparation and for said water ice detection measurements, and
(b) said movements made to place each of said site preparation tools and said water ice sensor with probes sequentially over and then against said test site measurement point, and
(c) then assigned tasks are carried out of first scraping the prospective measurement site, then cleansing it, then cutting impressions in it and then placing the water ice detection sensor electrodes in or against it.

5. The water ice detection apparatus recited in claim 1 for said lander spacecraft or rover spacecraft or astronaut positioned instrument, each spacecraft or astronaut positioned instrument equipped with said robotic arm or said moveable carriage wherein:
(a) each of said site preparation tools and the water ice detection sensor is attached to the robotic arm or moveable carriage on a separate mechanism, and
(b) each of the separate mechanisms is driven to control the position of the tool, sensor or probes with respect to the surface of the heavenly body so the tool, sensor or probe may carry out its respective task of scraping, cleansing, cutting or water ice detection.

6. The water ice detection apparatus recited in claim 1 for said lander spacecraft or rover spacecraft or astronaut positioned instrument wherein:
(a) the position of each tool, sensor or probe is measured with respect to the surface of the heavenly body based on data provided by video cameras which simultaneously view the apparatus and the prospective measurement site, and
(b) video cameras may be mounted on the spacecraft tool, sensor or probe and on the robotic arm or moveable carriage and on each mechanism, and
(c) position data may also be provided by proximity sensors or from motor revolution counters.

7. The water ice detection apparatus recited in claim 1 for said lander spacecraft or rover spacecraft or astronaut positioned instrument, of the moveable carriage type, wherein:
(a) a folded version of said water ice detection cross is attached to said moveable carriage in a way to minimize the vertical height of said lander spacecraft or rover spacecraft or astronaut positioned instrument, and
(b) the folded version designed to minimize overturning forces and moments generated on it during heavenly body surface scraping, surface cleansing, surface cutting and water ice sensor electrode insertion into the surface of said heavenly body.

8. The water ice detection apparatus recited in claim 1 for said lander spacecraft or rover spacecraft where smaller versions of these spacecraft, a few feet in length or smaller, are used wherein:
(a) these smaller spacecrafts are equipped with stabilizers on their outer extremities, and
(b) said stabilizers are inserted on or in the surface of said heavenly body to resist and remove any and all forces and moments induced on the spacecraft during heavenly body surface scraping, surface cleansing, surface cutting or water ice detection measurements.

9. The water ice detection apparatus recited in claim 1 for said lander spacecraft or rover spacecraft or astronaut positioned instrument wherein:
(a) said lander spacecraft or rover spacecraft or astronaut positioned instrument is equipped with a communication transceiver, and
(b) the communication transceiver operates to send and receive data, control and operational updates, software and videos to and from said spacecraft or said instrument and to and from the earth via relay satellites circling overhead.

\* \* \* \* \*